(12) United States Patent
Chisholm

(10) Patent No.: US 9,996,362 B2
(45) Date of Patent: Jun. 12, 2018

(54) DIAGNOSTICS ONLY BOOT MODE

(71) Applicant: NCR Corporation, Duluth, GA (US)

(72) Inventor: Gordon Chisholm, Perth (GB)

(73) Assignee: NCR Corporation, Atlanta, GA (US)

( * ) Notice: Subject to any disclaimer, the term of this patent is extended or adjusted under 35 U.S.C. 154(b) by 0 days. days.

(21) Appl. No.: 14/927,737

(22) Filed: Oct. 30, 2015

(65) Prior Publication Data

US 2017/0123809 A1    May 4, 2017

(51) Int. Cl.
*G06F 17/00*    (2006.01)
*G06F 9/44*    (2018.01)
*G06F 11/07*    (2006.01)

(52) U.S. Cl.
CPC .......... *G06F 9/4401* (2013.01); *G06F 11/079* (2013.01); *G06F 11/0772* (2013.01)

(58) Field of Classification Search
CPC ........ G06F 11/00; G06F 11/14; G06F 11/263; G06F 15/00
USPC ........................................................... 713/2
See application file for complete search history.

(56) References Cited

U.S. PATENT DOCUMENTS

| | | | | | |
|---|---|---|---|---|---|
| 5,463,766 A | * | 10/1995 | Schieve | ................ | G06F 9/4401 711/103 |
| 5,504,801 A | * | 4/1996 | Moser | ...................... | G06F 8/65 379/27.01 |
| 2004/0102917 A1 | * | 5/2004 | Chen | ................... | G06F 11/2221 702/120 |
| 2005/0268175 A1 | * | 12/2005 | Park | ...................... | G06F 11/006 714/43 |
| 2005/0278147 A1 | * | 12/2005 | Morton | ............... | G06F 11/2273 702/183 |
| 2006/0230202 A1 | * | 10/2006 | Lee | ................... | G06K 19/07732 710/62 |
| 2006/0294359 A1 | * | 12/2006 | Chou | .................... | G06F 21/575 713/2 |
| 2007/0011507 A1 | * | 1/2007 | Rothman | ............ | G06F 11/2736 714/718 |
| 2008/0067232 A1 | * | 3/2008 | Whytock | ................ | G06F 21/57 235/379 |
| 2008/0082813 A1 | * | 4/2008 | Chow | ..................... | G06F 21/34 713/2 |
| 2009/0157356 A1 | * | 6/2009 | Jiang | ........................ | G06F 11/27 702/183 |
| 2010/0088545 A1 | * | 4/2010 | Hishinuma | .......... | G06F 11/2284 714/25 |
| 2011/0022826 A1 | * | 1/2011 | More | ........................ | G06F 1/26 713/1 |
| 2011/0099359 A1 | * | 4/2011 | O'Neil | .................. | G06F 9/4406 713/2 |
| 2011/0138220 A1 | * | 6/2011 | Gough | ................ | G06F 11/1004 714/5.1 |
| 2011/0154481 A1 | * | 6/2011 | Kilgore | ................... | G06F 21/31 726/19 |
| 2011/0296194 A1 | * | 12/2011 | Herkes | .................... | G06F 21/34 713/185 |

(Continued)

*Primary Examiner* — Vincent Tran
(74) *Attorney, Agent, or Firm* — Schwegman, Lundberg & Woessner

(57) ABSTRACT

Systems and methods for utilizing a diagnostics only boot mode may include initializing, by a computing device comprising a processor, a boot sequence. The computing device may detect installation of a hardware module. In response to detection of the hardware module, the computing device may initialize an alternate boot sequence.

18 Claims, 2 Drawing Sheets

(56) References Cited

U.S. PATENT DOCUMENTS

| | | | | |
|---|---|---|---|---|
| 2012/0117370 | A1* | 5/2012 | Saretto | G06F 11/2284 |
| | | | | 713/2 |
| 2013/0191623 | A1* | 7/2013 | Yamashita | G06F 9/4401 |
| | | | | 713/2 |
| 2014/0059338 | A1* | 2/2014 | Snoussi | G06F 9/4406 |
| | | | | 713/2 |
| 2014/0115573 | A1* | 4/2014 | Lenger | G07F 17/32 |
| | | | | 717/170 |
| 2014/0230052 | A1* | 8/2014 | Zhang | G06F 21/575 |
| | | | | 726/22 |
| 2014/0237223 | A1* | 8/2014 | Chudgar | G06F 9/4416 |
| | | | | 713/2 |
| 2014/0281443 | A1* | 9/2014 | Craig | G06Q 30/012 |
| | | | | 713/1 |
| 2015/0126132 | A1* | 5/2015 | Chung | H04B 1/3827 |
| | | | | 455/67.14 |
| 2015/0220411 | A1* | 8/2015 | Shivanna | G06F 11/2289 |
| | | | | 714/19 |
| 2017/0076081 | A1* | 3/2017 | Raskin | G06F 21/34 |

* cited by examiner

DIAGNOSTICS ONLY BOOT MODE

BACKGROUND

Self-service terminals have become ubiquitous within the retail and banking environments. At the retail level, self-service terminals reduce labor requirements and increase check-out efficiency by allowing one cashier to oversee four check-out lanes. Within the financial services sector, self-service terminals, or automated teller machines, allow banking and other financial customers to make withdrawals and deposits or perform other financial transactions without having to find time to visit a financial institution during banker's hours or even visit a financial institution.

SUMMARY

Systems and methods for utilizing a diagnostics only boot mode may include initializing, by a computing device comprising a processor, a boot sequence. The computing device may detect installation of a hardware module. In response to detection of the hardware module, the computing device may initialize an alternate boot sequence.

BRIEF DESCRIPTION OF THE FIGURES

The above-mentioned and other features and advantages of this disclosure, and the manner of attaining them, will become more apparent and the disclosure itself will be better understood by reference to the following description of embodiments taken in conjunction with the accompanying drawings, wherein.

Corresponding reference characters indicate corresponding parts throughout the several views. The exemplifications set out herein illustrate example embodiments, and such exemplifications are not to be construed as limiting the scope of the disclosure in any manner.

DETAILED DESCRIPTION

Figure 1:
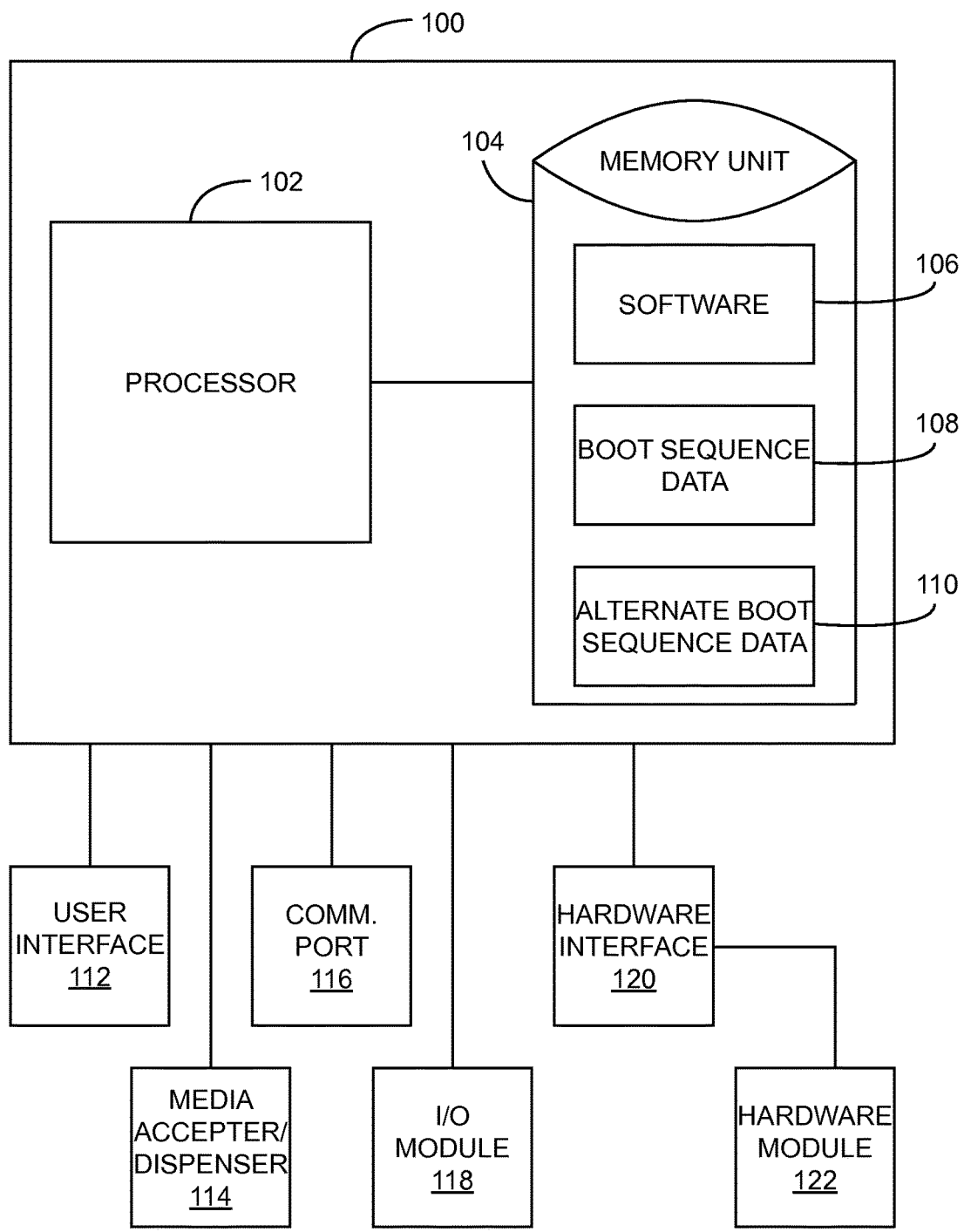
FIG. 1 shows an example self-service terminal consistent with the disclosure.

The following detailed description refers to the accompanying drawings. Wherever possible, the same reference numbers are used in the drawings and the following description to refer to the same or similar elements. While embodiments and examples are described, modifications, adaptations, and other implementations are possible. For example, substitutions, additions, or modifications may be made to the elements and stages illustrated in the drawings, and the systems and methods described herein may be modified by substituting, reordering, or adding stages to the disclosed methods or elements to the discloses systems. Accordingly, the following detailed description does not limit the disclosure. Instead, the proper scope of any invention disclosed herein is defined by the appended claims.

At times self-service terminals may enter an unstable state. When in the unstable state the self-service terminal may not be able to boot in a manner that allows all modules and routines in a software stack to execute such that the self-service terminal is operable in a secure mode. At times, the unstable state may be so extreme that the self-service terminal continuously reboots. This is sometimes referred to as a persistent restart state. Because of the constant rebooting, a technician may not be able to access onboard diagnostic tools before the self-service terminal shuts down and reboots.

To aid in diagnosing which component of the self-service terminal may be faulty, a diagnostic boot mode may be utilized. To utilize the diagnostic boot mode a unique hardware component may be used. For example, a service technician may install a unique hardware component prior to a boot sequence. The unique hardware component may be recognized by the self-service terminal during the boot sequence. Upon recognition of the unique hardware component the self-service terminal may enter an alternative boot mode such as a diagnostic boot mode.

The diagnostic boot mode may allow the service technician to individually activate and deactivate various hardware and software modules of the self-service terminal. Individual activation and deactivation of various hardware and software modules may allow the service technician to isolate and repair a faulty hardware module or fault software component.

FIG. 1 shows an example schematic of a self-service terminal 100. As shown in FIG. 1, the self-service terminal 100 may include a processor 102 and a memory unit 104. The memory unit 104 may include software 106, boot sequence data 108, and alternate boot sequence data 110. While executing on the processor 102, the software 104 may perform processes for executing a boot sequence and an alternate boot sequence, including, for example, one or more stages included in method 200 described below with respect to FIG. 2.

The boot sequence data 108 may include instructions, algorithms, and other information that the processor 102 may utilize to initialize various hardware and software used by the self-service terminal 100 in performing financial transactions. The alternate boot sequence data may include instructions, algorithms, and other information that the processor 102 may utilize to initialize a diagnostic mode of operation as described herein.

The self-service terminal 100 may also include a user interface 112. The user interface 112 may include any number of devices that allow a user to interface with the self-service terminal 100. Non-limiting examples of the user interface 112 include a keypad, a microphone, a speaker, a display (touchscreen or otherwise), etc.

The self-service terminal 100 may also include a media acceptor/dispenser 114. The media acceptor/dispenser 114 may include any number of devices that allow a user to insert media into or receive media from the self-service terminal 100. The media acceptor/dispenser 114 may be a single unit that performs both functions of accepting and dispensing media or the media acceptor/dispenser 114 may be multiple units. Each of the multiple units may perform a single function. For example, a first unit may accept media and a second unit may dispense media.

The self-service terminal 100 may also include a communications port 116. The communications port 116 may allow the self-service terminal 100 to communicate with information systems, remote servers, other self-service terminals, etc. Non-limiting examples of the communications port 116 include, Ethernet cards (wireless or wired), Bluetooth® transmitters and receivers, near-field communications modules, etc.

The self-service terminal 100 may also include an input/output (I/O) device 118. The I/O device 118 may allow the self-service terminal 100 to receive and output information. Non-limiting examples of the I/O device 118 include, a camera (still or video), a printer, a scanner, etc.

The self-service terminal 100 may also include a hardware interface 120. The hardware interface 120 may allow a hardware module 122 to be connected to the self-service terminal 100. Non-limiting examples of the hardware interface include a universal serial bus (USB) port, a IEEE 1394 (FireWire) port, a serial port, a parallel, a thunderbolt port, PS/2 port, small computer system interface (SCSI), etc.

The hardware module 122 may be a device that a service technician installs and upon initialization of a boot sequence, using the boot sequence data 108, may be detected by the self-service terminal 100. Non-limiting examples of the hardware module 122 include a secure service dongle, a USB flash drive, a hardware lock, etc. The hardware module 122 can be a very specific piece of hardware issued to a service organization. In other words, the hardware module 122 can be a dedicated piece of hardware that can be purchase from a supplier that cannot be copied. For instance, the hardware module 122 can include a distinctive property that is identifiable by the boot sequence. For example, the hardware module 122 can be a USB device, such as a dongle, that has encrypted information stored on it. The dongle can have a USB device that has a unique vendor identifier and a unique product identifier that identifies itself to the system. There may or may not be software stored on the dongle. The information stored on the hardware module 122, such as the distinctive property, may or may not be accessible via operations of the self-service terminal 100 other than the boot sequence.

Figure 2:
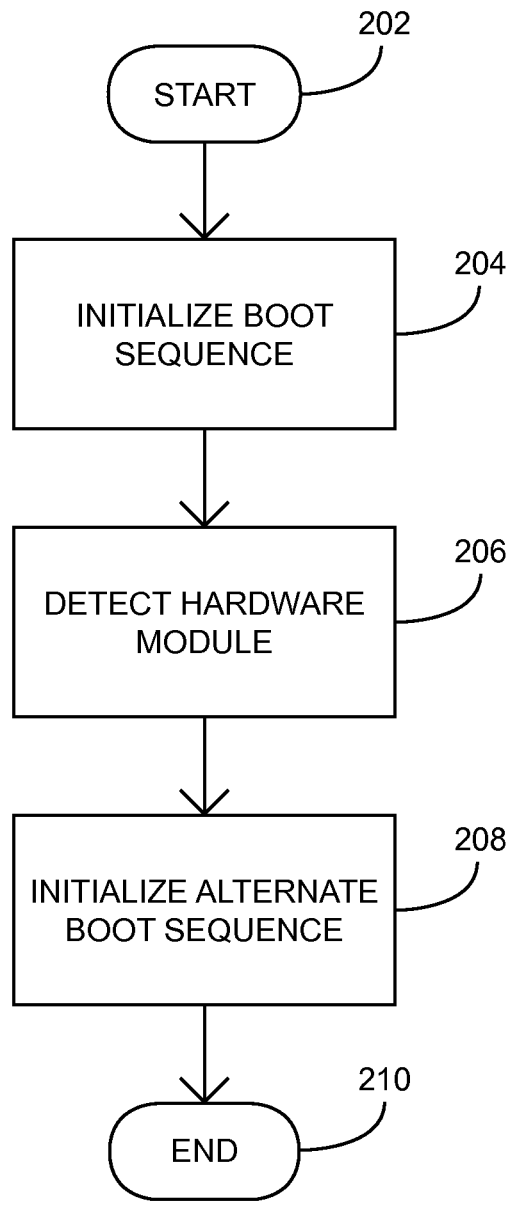
FIG. 2 shows an example method for a diagnostic boot mode.

FIG. 2 shows an example method 200 for entering an alternative boot mode. The method 200 may begin at stage 202 and proceed to stage 204 where a boot sequence may be initialized by the processor 102. The processor 102 may initialize the boot sequence in response a service technician attempting repairs after the self-service terminal 100 has automatically shut down. For example, the self-service terminal 100 may experience a fault and may enter an unstable state where the self-service terminal 100 continuously reboots in an attempt to correct the fault. After a present number of reboot attempts, the self-service terminal 100 may shutdown. After the shutdown, a service technician may initialize the boot sequence. However, before initializing the boot sequence the service technician may install the hardware module 122 into the hardware interface 120.

From stage 204, the method 200 may proceed to stage 206 where the processor 102 may detect the hardware module 122. For example, upon initializing the boot sequence the processor 102 may recognize that a dongle has been inserted into a USB port of the self-service terminal 100. The detection of the hardware module 122 may be in response to an initial stage of the boot sequence that directs the processor 102 to check for newly installed hardware modules.

From stage 206, the method 200 may proceed to stage 208 where an alternate boot sequence may be initialized. The alternate boot sequence may be a diagnostic boot sequence. For example, the alternate boot sequence may be a boot sequence that only allows for diagnostic operations to be performed and not financial transactions.

Initializing the alternate boot sequence may include terminating the boot sequence. For example, upon detection of the hardware module 122, the process 102 may terminate a normal boot sequence in order to initialize the alternate boot sequence. By terminating the normal boot sequence, the processor 102 may prevent various hardware and software modules from being initialized.

In addition, the processor 102 may disable device drivers for non-essential components. Disabling device drivers can include, but is not limited to not loading or bypassing loading of certain drivers. Non-essential components may be components that are not needed for a technician to perform basic diagnostic services. Non-limiting examples of non-essential components may include the media accepter/dispenser 114, and the communications port 116.

In addition to hardware components, non-essential components may include software components. For example, a particular function of the self-service terminal 100 may be performed using only software. During the alternate boot sequence the particular function may be disabled.

In addition to disabling non-essential components, the alternate boot sequence may include disabling a start notification to prevent the self-service terminal 100 or a component of the self-service terminal 100 from entering service. For example, during the alternate boot sequence a start notification normally found in a normal boot sequence that would allow the self-service terminal 100 to initialize communication with a central server or other financial clearing house to signify that the self-service terminal 100 is online and available to conduct financial transactions may be disabled. Disabling a start notification can include disabling a start notification or not executing a portion of the sequence that puts the computing device in service.

As part of initializing the alternate boot sequence, the processor 102 may present a menu on a display, such as the user interface 112. The menu may include a listing of diagnostic tests. The processor 102 may receive an input. For example, a service technician may make a selection from the menu, such as with the user interface 112. The input may identify a disabled module or modules. For instance, the input may identify a communications testing application stored on the memory unit 104 and the communications port 116. Upon receiving the input, the processor 102 may active the communications port 116 and the communications testing application and execute a diagnostic protocol to test the communications port 116. Other modules, such as the media accepter/dispenser 112, etc. may be activated.

Using the menu, the service technician may be able to test each module of the self-service terminal 100 individually or multiple modules in combination with one another. Testing the modules individually may allow the service technician to identify a faulty module. Testing multiple modules in combination with one another may allow the service technician to identify modules that when operating simultaneously are causing faults. Stated another way, by utilizing the alternate boot sequence, the service technician may test various operations of the self-service terminal 100 to pinpoint a module or modules that may be causing the unstable operation and triggering a persistent restart state.

The diagnostic menu may only be available for display after initialization of the alternate boot sequence. For example, the alternate boot sequence and the diagnostic menu may be stored on the memory unit 104, but only accessible when the self-service terminal detects the hardware module 122 upon executing a normal boot sequence. The alternate boot sequence and diagnostic functions may be stored within dedicated memory that is only accessible upon detection of the hardware module 122. Use of dedicated memory, which may be read only, may protect the alternate boot sequence from corruption.

The alternate boot sequence may also be stored on the hardware module 122. For example, upon installing the hardware module 122, the self-service terminal 100 may detect the hardware module 122 and execute the alternate boot sequence by loading the alternate boot sequence from the hardware module 122.

From stage 208, the method 200 may proceed to stage 210 where the method 200 may terminate.

Some of the above embodiments have the advantage that a special mode for a secured system (for example, a system that does not allow a boot from a different device) can be invoked when the system is in such an unstable state that a normal start of the whole software stack in the system is not possible. This special mode could be used to help diagnose and resolve any problems in the software or hardware of the system that prevents normal booting of the system.

The memory 104 is only shown as a single entity for illustration purposes. The memory may comprise BIOS (basic input/output system) memory and/or main memory.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A method comprising:
   initializing, by an automated teller machine comprising a processor, a boot sequence including an installed hardware detection phase associated with an alternate boot sequence and a diagnostic mode of operation;
   detecting, by the automated teller machine, during the installed hardware detection phase of the boot sequence an installed hardware module including detecting a unique identifier associated with a service provider from the installed hardware module by the boot sequence; and
   initializing, by the automated teller machine, the alternate boot sequence and the diagnostic mode of operation in response to detection of the installed hardware module by detection of the unique identifier from the installed hardware module, wherein the alternate boot sequence includes disabling a start notification to prevent the automated teller machine from communicating with a financial clearing house to signify that the automated teller machine is online and available to conduct a financial transaction.

2. The method of claim 1, wherein the alternate boot sequence includes disabling device drivers for non-essential components.

3. The method of claim 1, further comprising terminating the boot sequence.

4. The method of claim 1, further comprising:
   receiving an input that identifies a disabled module; and
   activating the disabled module for testing in response to receiving the input.

5. The method of claim 1, further comprising displaying, on a display of the automated teller machine, a diagnostic menu only after initialization of the alternate boot sequence.

6. The method of claim 1, wherein the installed hardware module is a secure service dangle inserted into a USB port and the unique identifier includes a unique vendor identifier or a unique product identifier.

7. An automated teller machine comprising:
   a processor; and
   a memory that includes instructions that, when executed by the processor, cause the processor to perform operations comprising:
      initializing a boot sequence including an installed hardware detection phase associated with an alternate boot sequence and a diagnostic mode of operation,
      detecting during the installed hardware detection phase of the boot sequence an installed hardware module including detecting a unique identifier associated with a service provider from the installed hardware module by the boot sequence, and
      initializing the alternate boot sequence and the diagnostic mode of operation in response to detection of the installed hardware module by detection of the unique identifier from the installed hardware module, wherein the alternate boot sequence includes disabling a start notification to prevent the automated teller machine from communicating with a financial clearing house to signify that the automated teller machine is online and available to conduct a financial transaction.

8. The automated teller machine of claim 7, wherein the alternate boot sequence includes disabling device drivers for non-essential components.

9. The automated teller machine of claim 7, wherein the instructions further comprise terminating the boot sequence.

10. The automated teller machine of claim 7, wherein the instructions further comprise:
    receiving an input that identifies a disabled module; and
    activating the disabled module for testing in response to receiving the input.

11. The automated teller machine of claim 7, further comprising a first display and a second display in communication with the processor and wherein the instructions further comprise displaying a diagnostic menu on the second display only after initialization of the alternate boot sequence.

12. The automated teller machine of claim 7, wherein the hardware module is a service dongle.

13. The automated teller machine of claim 12, wherein the alternate boot sequence is stored on the service dongle.

14. The automated teller machine of claim 7, wherein the alternate boot sequence is stored on the memory.

15. The automated teller machine of claim 14, wherein a default boot sequence is stored on the memory and the processor is configured to access the alternate boot sequence instead of the default boot sequence following installation of the hardware module.

16. An automated teller machine comprising:
    a display;
    a hardware interface;
    a processor; and
    a memory that includes instructions that, when executed by the processor, cause the processor to perform operations comprising:
       detecting during an installed hardware detection phase of a boot sequence associated with an alternate boot sequence and a diagnostic mode of operation an installed hardware module at the hardware interface, the installed hardware module including a unique identifier associated with a service provider and identifiable from the installed hardware module by the boot sequence,
       initializing the alternate boot sequence and the diagnostic mode of operation in response to detection of the installed hardware module by detection of the unique identifier from the installed hardware module, wherein the alternate boot sequence includes disabling a start notification to prevent the automated teller machine from communicating with a financial clearing house to signify that the automated teller machine is online and available to conduct a financial transaction, and
       transmitting a diagnostic menu to the display.

17. The automated teller machine of claim 16, wherein the alternate boot sequence includes disabling device drivers for non-essential components.

18. The automated teller machine of claim 16, wherein the instructions further comprise:
  receiving an input that identifies a disabled module; and
  activating the disabled module for testing in response to receiving the input.

\* \* \* \* \*